US006754386B1

(12) United States Patent
Williamson et al.

(10) Patent No.: US 6,754,386 B1
(45) Date of Patent: Jun. 22, 2004

(54) METHOD AND SYSTEM OF MATCHING INK PROCESSOR AND RECOGNIZER WORD BREAKS

(75) Inventors: Peter H. Williamson, Kirkland, WA (US); Charlton E. Lui, Redmond, WA (US); Dan W. Altman, Kirkland, WA (US)

(73) Assignee: Microsft Corporation, Redmond, WA (US)

( * ) Notice: Subject to any disclaimer, the term of this patent is extended or adjusted under 35 U.S.C. 154(b) by 307 days.

(21) Appl. No.: 09/643,417

(22) Filed: Aug. 22, 2000

(51) Int. Cl.[7] ................................................. G06K 9/34
(52) U.S. Cl. ........................ 382/177; 382/186; 382/187; 382/218; 382/229
(58) Field of Search ................................ 382/177, 178, 382/179, 186, 187, 188, 189, 229, 209, 217, 218

(56) References Cited

U.S. PATENT DOCUMENTS

| 5,594,640 | A | | 1/1997 | Capps et al. |
|---|---|---|---|---|
| 5,615,285 | A | | 3/1997 | Beernink |
| 5,675,665 | A | | 10/1997 | Lyon |
| 5,682,439 | A | | 10/1997 | Beernink et al. |
| 5,710,916 | A | | 1/1998 | Barbara et al. |
| 5,764,799 | A | | 6/1998 | Hong et al. |
| 5,812,697 | A | * | 9/1998 | Sakai et al. .................. 382/186 |
| 5,828,991 | A | | 10/1998 | Skiena et al. |
| 5,855,000 | A | | 12/1998 | Waibel et al. |
| 5,857,099 | A | | 1/1999 | Mitchell et al. |
| 5,953,451 | A | | 9/1999 | Syeda-Mahamood |
| 5,960,447 | A | | 9/1999 | Holt et al. |
| 5,995,664 | A | | 11/1999 | Shimomura |
| 6,005,973 | A | | 12/1999 | Seybold et al. |
| 6,014,460 | A | | 1/2000 | Fukushima et al. |
| 6,041,141 | A | | 3/2000 | Yamamoto et al. |
| 6,111,985 | A | | 8/2000 | Hullender et al. |
| 6,473,517 | B1 | * | 10/2002 | Tyan et al. .................. 382/105 |
| 6,493,464 | B1 | | 12/2002 | Hawkins et al. |
| 2002/0013795 | A1 | | 1/2002 | Dresevie et al. |
| 2002/0049796 | A1 | | 4/2002 | Dresevie et al. |

FOREIGN PATENT DOCUMENTS

JP 07110845 4/1995

OTHER PUBLICATIONS

Liang et al. "Efficient Algorithms for Segmentation and Recognition of Printed Characters in Document Processing." IEEE Pacific Rim Conf. on Communications, Computers and Signal Processing, vol. 1, May 19, 1993, pp. 240–243.*

Lee et al. "A New Methodology for Gray–Scale Character Segmentation and Recognition." Proc. of the 3rd Int. Conf. on Document Analysis and Recognition, vol. 1, Aug. 14, 1995, pp. 524–527.*

(List continued on next page.)

Primary Examiner—Jon Chang
(74) Attorney, Agent, or Firm—Law Offices of Albert S. Michalik, PLLC

(57) ABSTRACT

In a computing device that receives handwritten data, a method and system that corrects for parser segmentation errors by sending an entire line of ink to a recognizer, and then comparing, on a word-by-word basis, the initial segmentation guesses of the parser with the more-thoroughly recognized segmentation results of the handwriting recognition engine. In the correction process, the ink words are efficiently adjusted with relatively little data manipulation. As the recognizer is fed a series of strokes on a line, the recognizer returns segmentation information. For ink word breaks that are the same for any given set of data, the existing ink word is unchanged. For ink words that are recognized differently relative to their initial segmentation, one or more new ink words are created and the handwriting (including stroke) data of the parser's ink word is manipulated to create a new ink processor word (or words) to match the recognizer output.

23 Claims, 10 Drawing Sheets

OTHER PUBLICATIONS

Ariki et al. "Segmentation and Recognition of Handwritten Characters Using Subspace Method." Proc. of the 3rd Int. Conf. on Document Analysis and Recognition, vol. 1, Aug. 14, 1995, pp. 120–123.*

Zhao et al. "A New Method for Segmenting Unconstrained Handwritten Numeral String." Proc. of the $4^{th}$ Int. Conf. on Document Analysis and Recognition, vol. 2, Aug. 18, 1997, pp. 524–527.*

Arica et al. "A New Scheme for Off–Line Handwritten Connected Digit Recognition." Proc. KES '98, $2^{nd}$ Int. Conf. on Knowledge–Based Intelligent Electronic Systems, vol. 2, Apr. 21, 1998, pp. 329–335.*

Jung et al. "Machine Printed Character Segmentation Method Using Side Profiles." Proc. SMC '99, IEEE Int. Conf. on Systems, Man, and Cybernetics, vol. 6, Oct. 12, 1999, pp. 863–867.*

Senda et al. "Document Image Retrieval System Using Character Candidates Generated by Character Recognition Process." Proc. Of the $2^{nd}$ Int. Conf. on Document Analysis and Recognition, Oct. 20, 1993, pp. 541–546.

Carrano. Data Abstraction and Problem Solving with C++; Walls and Mirrors. The Benjamin/Cummings Publishing Company, Inc,. 1995, pp. 150–163, 175–176, 179–180.

Morita et al. "A Fast and Compact Data Structure of Storing Multi–Attribute Relations Among Words." IEEE In Conf. on Systems, Man and Cybernetics, vol. 3, Oct. 11, 1998, pp. 2791–2796.

* cited by examiner

METHOD AND SYSTEM OF MATCHING INK PROCESSOR AND RECOGNIZER WORD BREAKS

FIELD OF THE INVENTION

The present invention relates generally to computer devices, and more particularly computer devices arranged to receive handwritten input.

BACKGROUND OF THE INVENTION

Contemporary computing devices allow users to enter handwritten words (e.g., in cursive handwriting and/or printed handwritten characters) and symbols (e.g., a character in Far East languages). The words and symbols can be used as is, e.g., to function as readable notes and so forth, or can be converted to text for more conventional computer uses. To convert to text, for example, as a user writes strokes representing words or other symbols onto a touch-sensitive computer screen or the like, a handwriting recognizer (e.g., trained with millions of samples, employing a dictionary, context and other rules) is able to convert the handwriting data into dictionary words or symbols. In this manner, users are able to enter textual data without necessarily needing a keyboard.

However, contemporary recognizers are too processor-intensive to use continuously, particularly with small hand-held (pocket-sized) personal computers. Instead, the devices are configured such that users can request recognition when desired, or such that the recognizer operates only in the background so that the users do not have to wait for recognition on a word-by-word basis. Moreover, some recognizers are configured to use the context of surrounding words or symbols to help determine other words or symbols, and thus waiting to recognize groups of words often provides more accurate recognition.

At the same time, however, the user may wish to edit words and symbols before they have been recognized, e.g., delete a word, insert a word between two others, format a word, move words around, and so forth, such as by cutting and pasting. Also, the system needs to know when to wrap handwritten data to the next line, and needs to maintain this information as the user zooms the display in and out. As such, some relatively lightweight, initial ink processing is performed to parse the input data into various segments, without involving the recognizer. This initial processing may be orders of magnitude faster than full recognition, but has problems, however, in that because it only looks for limited characteristics via some fuzzy rules, the distinct segments initially determined may not actually correspond to the distinct words or symbols that the user intended. Thus, as a user edits words and zooms in and out, the user may undesirably find that what was intended to be one word is treated as two, two words treated as one, and so forth.

SUMMARY OF THE INVENTION

Briefly, the present invention provides a method and system that corrects for parser segmentation errors by sending an entire line of ink to a recognizer, and then comparing, on a word-by-word basis, the initial segmentation guesses of the parser with the more-thoroughly recognized segmentation results of the handwriting recognition engine. In the correction process, the ink words are efficiently adjusted with relatively little data manipulation. More particularly, the recognizer is fed a series of strokes on a line, in order, from which the recognizer returns its segmentation information. For ink word breaks that are the same between the ink parsing and the recognizer for any given set of data, the existing ink word is unchanged. For ink words that are recognized differently, a new ink word is created and the handwriting (including stroke) data of the parser's ink word is manipulated to create a new ink processor word (or words) to match the recognizer output.

The present invention thus retains the desirability of rapidly grouping sets of strokes into segmented ink word units as they are written, without first requiring complete recognition, for example for word processing (editing and zooming) purposes, and so forth. However, once recognition is performed, the segmentation performed by the lightweight parser, which is generally not as accurate as the segmentation performed by the recognizer, is efficiently and flexibly corrected by a data manipulation process to match the recognizer's output.

Other advantages will become apparent from the following detailed description when taken in conjunction with the drawings, in which:

DETAILED DESCRIPTION

Exemplary Operating Environment

Figure 1:
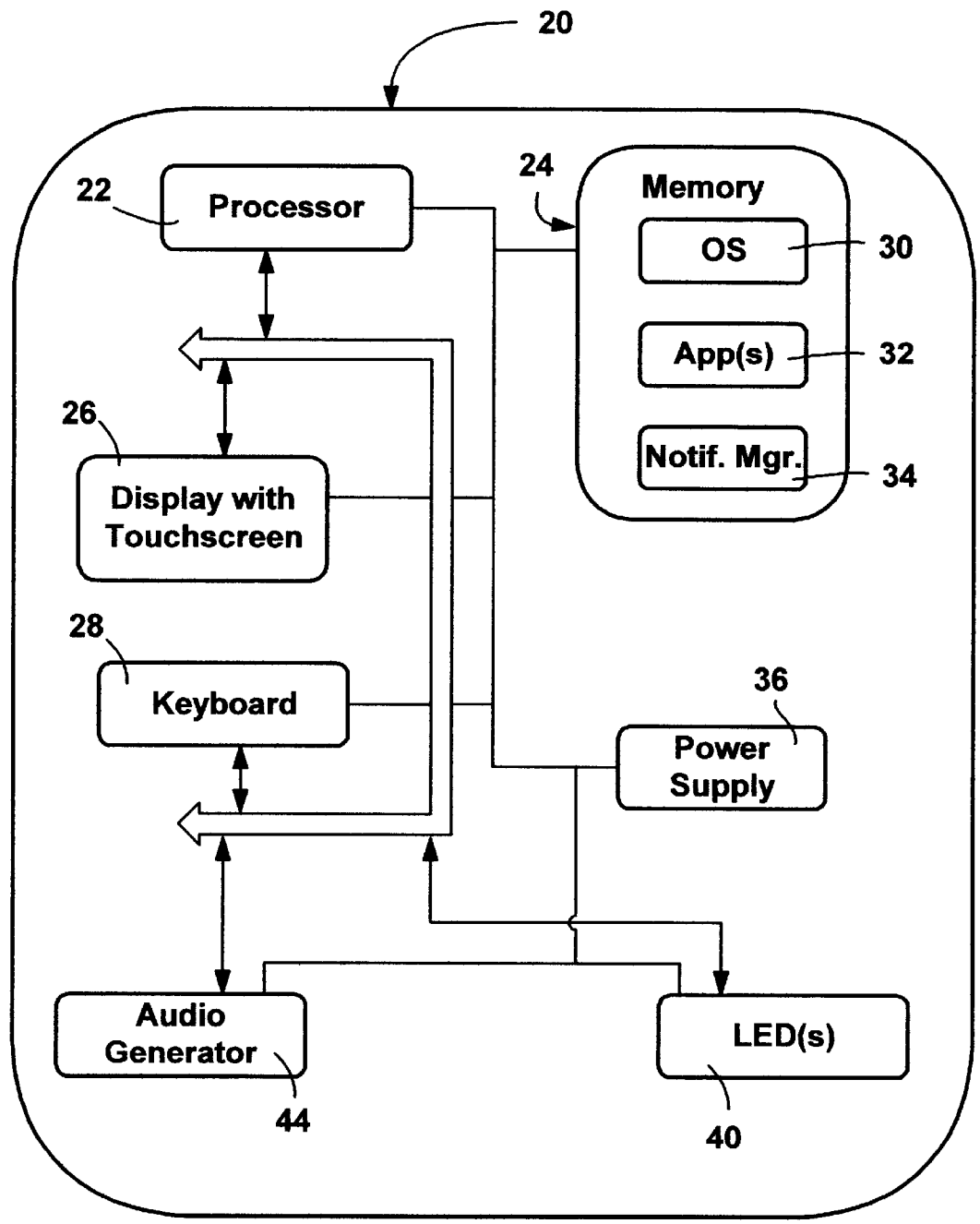
FIG. 1 is a block diagram representing one exemplary computer system into which the present invention may be incorporated.

FIG. 1 illustrates an example of a suitable operating environment 20 in which the invention may be implemented. The operating environment 20 is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The invention may be described in the general context of computer-executable instructions, such as program modules, executed by one or more computers or other devices. Generally, program modules include routines, programs, objects, components, data structures and so forth that perform particular tasks or implement particular abstract data types. Typically the functionality of the program modules may be combined or distributed as desired in various embodiments.

Computing device 20 typically includes at least some form of computer readable media. Computer-readable media can be any available media that can be accessed by the computing device 20. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by the computing device 20. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

FIG. 1 shows functional components of one such handheld computing device 20, including a processor 22, a memory 24, a display 26, and a keyboard 28 (which may be a physical or virtual keyboard). The memory 24 generally includes both volatile memory (e.g., RAM) and non-volatile memory (e.g., ROM, PCMCIA cards, and so forth). An operating system 30 is resident in the memory 24 and executes on the processor 22. The handheld personal computer 20 includes an operating system, such as the Windows® CE operating system from Microsoft® Corporation or other operating system.

One or more application programs 32 are loaded into memory 24 and run on the operating system 30. Examples of applications include email programs, scheduling programs, PIM (personal information management) programs, word processing programs, spreadsheet programs, Internet browser programs, and so forth. The handheld personal computer 20 may also include a notification manager 34 loaded in the memory 24, which executes on the processor 22. The notification manager 34 handles notification requests, e.g., from the application programs 32.

The handheld personal computer 20 has a power supply 36, which is implemented as one or more batteries. The power supply 36 may further include an external power source that overrides or recharges the built-in batteries, such as an AC adapter or a powered docking cradle.

The exemplary handheld personal computer 20 represented in FIG. 1 is shown with three types of external notification mechanisms: one or more light emitting diodes (LEDs) 40 and an audio generator 44. These devices may be directly coupled to the power supply 36 so that when activated, they remain on for a duration dictated by a notification mechanism even though the handheld personal computer processor 22 and other components might shut down to conserve battery power. The LED 40 preferably remains on indefinitely until the user takes action. Note that contemporary versions of the audio generator 44 use too much power for today's handheld personal computer batteries, and so it is configured to turn off when the rest of the system does or at some finite duration after activation.

Matching Ink Processor and Recognizer Word Breaks

Figure 2:
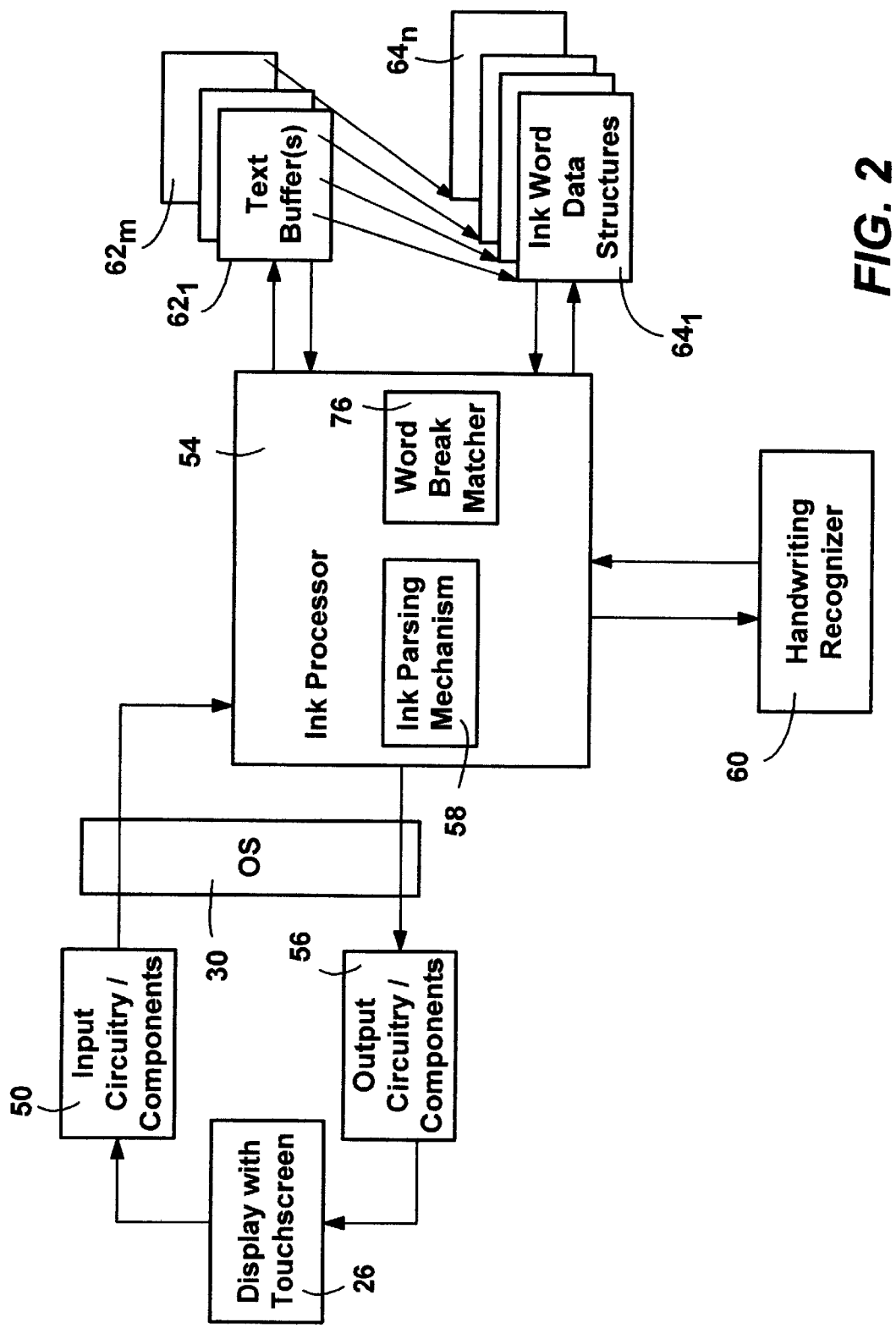
FIG. 2 is a block diagram generally representing components and data structures for handling electronic ink handwritten into a computer system and capable of implementing the present invention.

FIG. 2 represents general components and data structures of the computing system 20 when configured for handwriting recognition in accordance with one aspect of the present invention. In FIG. 2, as a user enters data such as by typing or by handwriting data on the touch screen display 26, input circuitry and/or other components 50 pass the information to the operating system 30. Depending on the state of the system and/or where the screen is contacted, the user input may be converted to text by the operating system or treated as handwritten data. For example, when the screen has a representation of a keyboard displayed thereon and that keyboard is touched, the coordinates may be converted to an ASCII or Unicode character, or an editing command, and sent to an appropriate component (e.g. word processor) to use. Alternatively, if the user is writing in a handwriting input area, the input circuitry 50/operating system 32 passes the data to an ink processor component 54 to process and otherwise handle the electronic ink data. Note that a user may enter the handwritten data (electronic ink) in another manner, such as via a tablet connected to a personal computer. As described below, one of the operations performed by the ink word processor is to initially segment the handwritten data into separate ink words for display on the display 26 via output circuitry/components 56.

As is understood, the handwritten data may be in the form of coordinates, and may include other information, e.g., pressure data, timing data and so forth. The ink processor component 54 may comprise an application program, or alternatively may be a subcomponent of or integrated into the operating system 30. The ink processor 54 may also be arranged to pass characters, (e.g., Unicode), whether typed or recognized from words or symbols, to conventional applications that can only deal with characters. For purposes of the present description, the ink processing component 54 will also perform the operations of a conventional word processor, e.g., handle both recognized text and unrecognized ink, allow the editing of words, both text words and handwritten words, update the display 26 (e.g., to word-wrap, mark or insert text or words, delete words) as appropriate, and so forth.

To initially segment the handwritten data into separate ink words, the ink processor 54 includes (or is otherwise associated with) an ink parsing mechanism 58. This segmentation is performed in an initial pass, before the ink data (and/or ink feature information) is passed to a handwriting recognizer 60 for conversion to recognized text or symbols. Segmentation enables the system to rapidly (relative to the time it takes for handwriting recognition) treat the data as separate words, including for editing and display (e.g., word wrapping) purposes.

As generally represented in FIG. 2, the ink processor 54 maintains one or more text buffers $62_1$–$62_m$. Each text buffer (e.g. $62_1$) is a data structure storing some or all of the contents of a document, such as individual letters, spaces, inked words, and drawings. For example, a text buffer can store the entire contents of a document, or each of a plurality of text buffers can represent one paragraph in a document.

To indicate an inked word, the text buffer (e.g., $62_1$) also contains special codes that indicate the locations of ink words $64_1$–$64_n$ relative to text and other items in the text buffer $62_1$. Each such code is directly followed by a pointer to the ink word data structure (sometimes referred to as a scrawl) that contains the ink data for that word.

Figure 3:
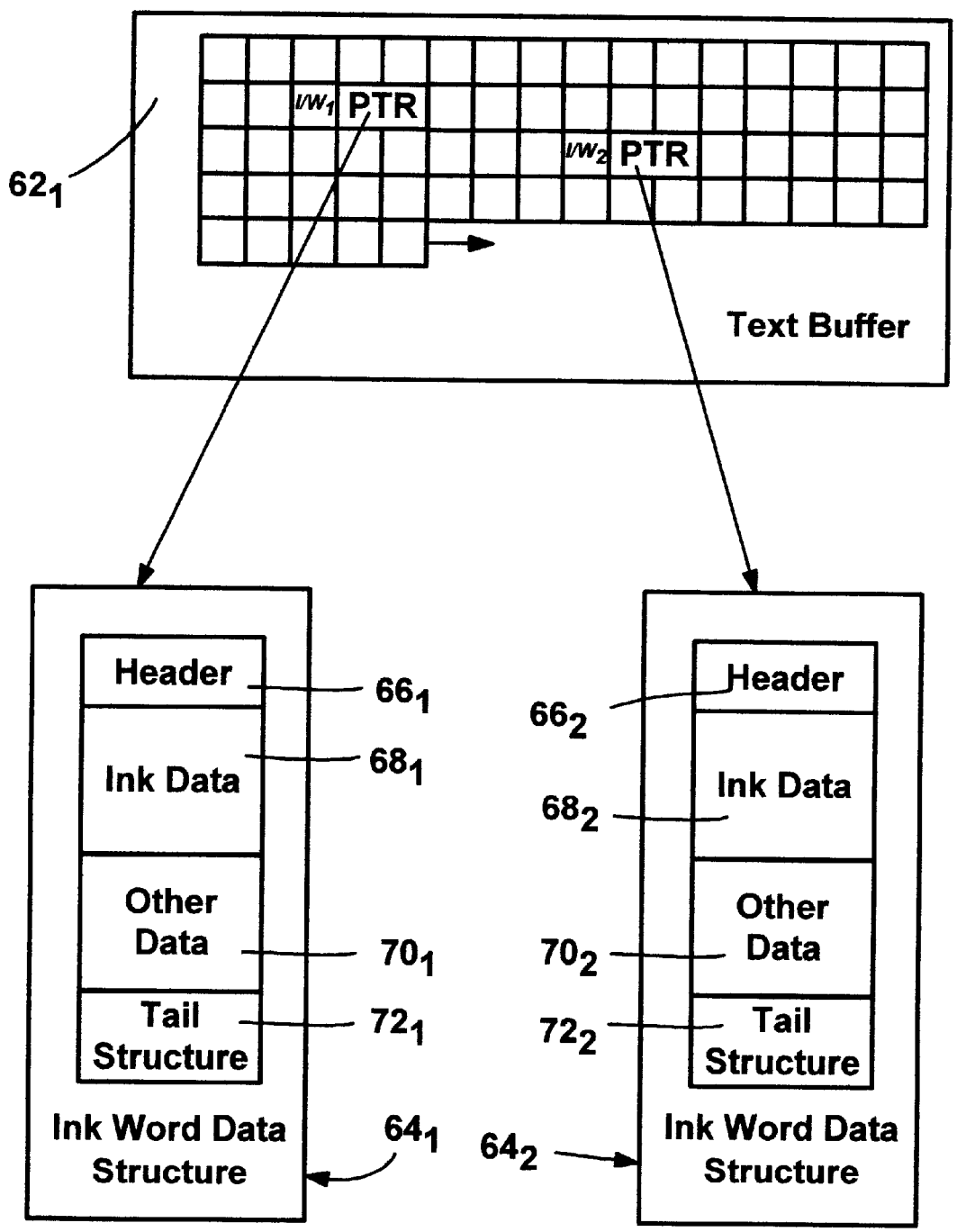
FIG. 3 is a representation of how handwritten data and text data is generally maintained by the ink processor.
Figure 4:
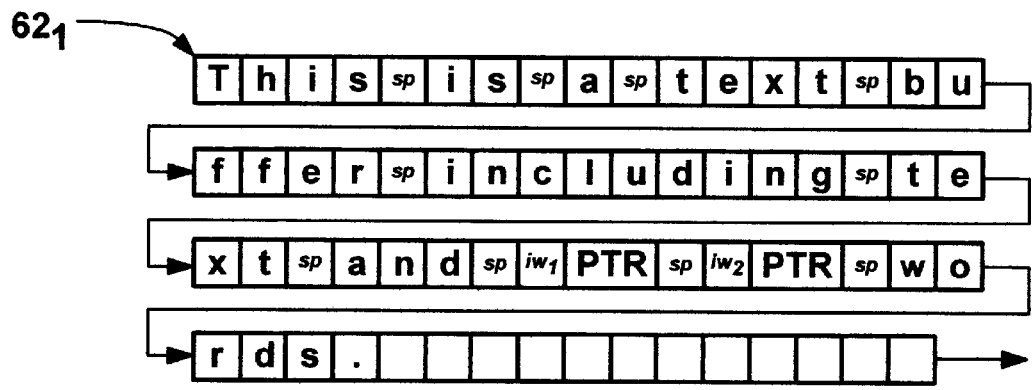
FIG. 4 is a representation of the contents of an example text buffer and how it is displayed to a user.
Figure 4:
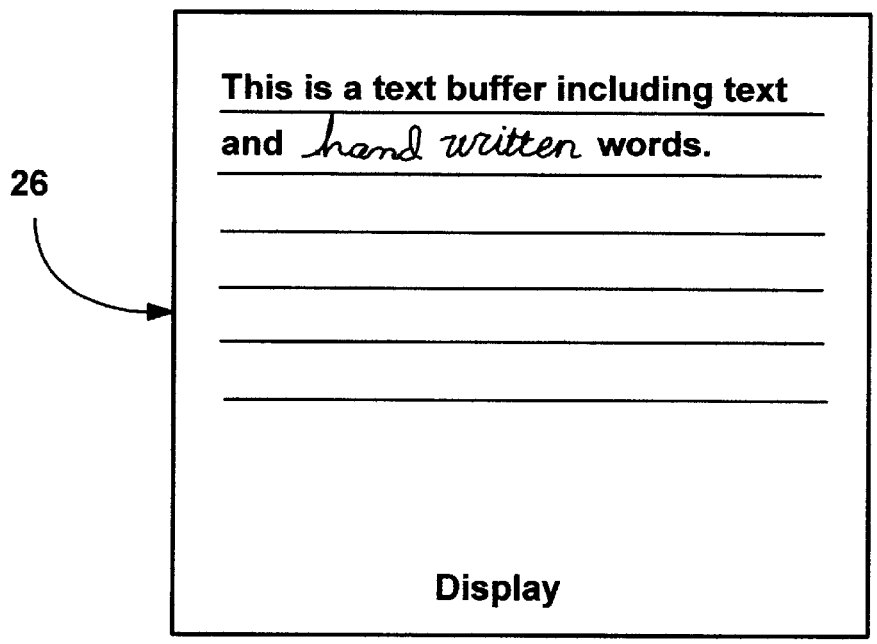

By way of example, FIG. 3 represents a text buffer (e.g., $62_1$) with memory (e.g., bytes) for text, possibly other items, and special ink word codes ($IW_1$ and $IW_2$), each code followed by its respective pointer to ink words $64_1$–$64_2$. As shown in FIG. 3, the pointers are two bytes in length, but of course pointers of other sizes are feasible. FIG. 4 shows how the text buffer $62_1$ (shown in FIG. 4 as a linear array) and its ink word data structures $64_1$–$64_2$ may be interpreted by the ink processor to result in a particular display, prior to the two ink words $64_1$–$64_2$ having been recognized as text by the recognizer 60.

As generally represented in FIG. 3, each ink word, such as the ink word 64, is a data structure having a header 66 which describes the ink data section 68 following it. In addition, other fields are possible, such as an other data field 70 followed by a tail structure field 72 that describes the other field 70. For example, the other field may include a list of alternates and probability information associated with those alternates returned by the recognizer 60 following recognition. Note that alternates are only described herein for completeness, and as will be understood, are not necessary to the present invention. The maintenance and use of the alternates, and the tail structure, are further described in related copending U.S. patent applications Ser. No. 09/644, 002 entitled "Method and System for Handling the Selection of Alternates for Recognized Words" Ser. No. 09/643,414 entitled "Method and System for Maintaining Alternates in Association with Recognized Words"; Ser. No. 09/643,617 entitled "Method and System for Searching for Words in Ink Word Documents"; and Ser. No. 09/643,997 entitled "Method and System for Extending Ink Word Data Structures while Maintaining Version Compatibility" filed concurrently herewith and hereby incorporated by reference.

The following table sets forth an ink word data structure (scrawl) including the tail structure:

```
// The Ink Word Structure
typedef struct TXT_SCRAWL
{
    U8           flags;
    U8           candidateChoice;  //index of chosen candidate
                                   //zero based
    INK_STYLE    inkStyle;
    COORD16      width;
    U16          strokeCount;
    U16          bufferSize;
    U8           buffer[2];        //padded for alignment
    // first comes the array of strokes
    //then comes a double null terminated list of strings
    //at the very end is a TXT_SCRAWL_TAIL struct
} TXT_SCRAWL, FAR * P_TEXT_SCRAWL;
// this buffer is appended onto the scrawl to optimize
// getting to strings. For compatibility reasons, it grows
// from the beginning, not the end of the tail structure,
// since a negative addressing scheme from the text scrawl
// end is used to get to its members
typedef struct TXT_SCRAWL_TAIL
{
    U32   tailStructVersion;  //starts at 1 and grows
                              //upwards;
    U32   stringAreaOffset;   //offset from beginning
                              //of TXT_SCRAWL to the
                              //start of the double
                              //null terminated string
                              //list.
    U32   chosenStringOffset; //offset from beginning
                              //of TXT_SCRAWL to the
                              //chosen string.
    U16   wchFirstXlateChar;  //first char of the
                              //chosen string.
// ADD ANY NEW MEMBERS AT THE END
} TXT_SCRAWL_TAIL * P_TEXT_SCRAWL_TAIL;
```

For purposes of simplicity herein, the present invention will primarily be described with respect to handwritten cursive words, using the English language for various examples. However, as will be understood, the present invention may operate with printed characters and symbols, and provides numerous benefits regardless of any particular language.

Figure 5:
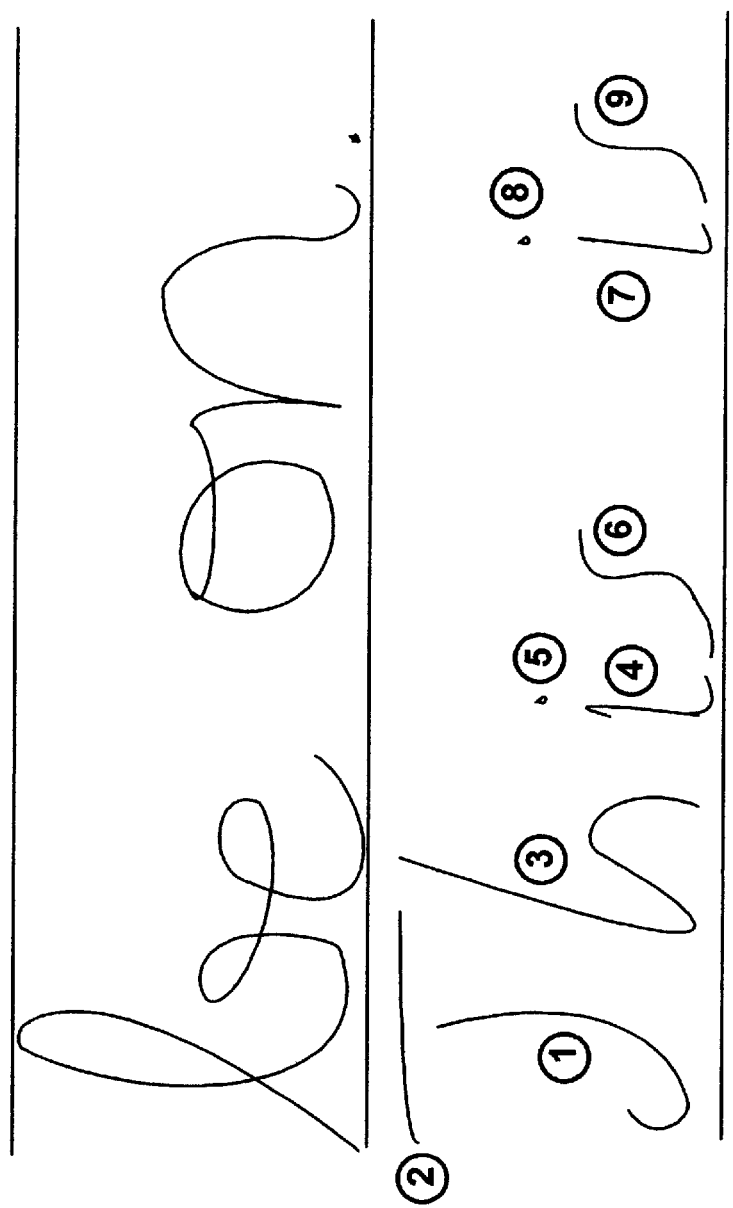
FIG. 5 is a representation of handwritten data as entered by a user and initially segmented into ink words after parsing by a ink processing mechanism.

As generally described above, one of the things that the ink processor 54 does is to rapidly segment handwritten data into words so that prior to recognition, (if any) the words can displayed and manipulated as separate items, e.g., for word wrapping and editing purposes. By way of example, consider a user writing a note on the computing device stating, "We need to find out which flight to be on. This is critical to the timing of . . . " As represented in FIG. 5, two lines of the display are shown, representing the user's ink (" . . . be on. This is . . . "), wherein in FIG. 5, the circled numerals correspond to separate strokes as determined by the ink processor 54, starting at number one for this second line. In a typical case, the ink parsing mechanism 58 will get the word breaks correct, whereby the user can select individual words or groups of words (e.g., for formatting cutting and pasting) that agree with what the user intended. One suitable ink processor that performs parsing is described in U.S. Pat. Nos. 5,517,578 and 5,613,019, hereby incorporated by reference.

Figure 6:
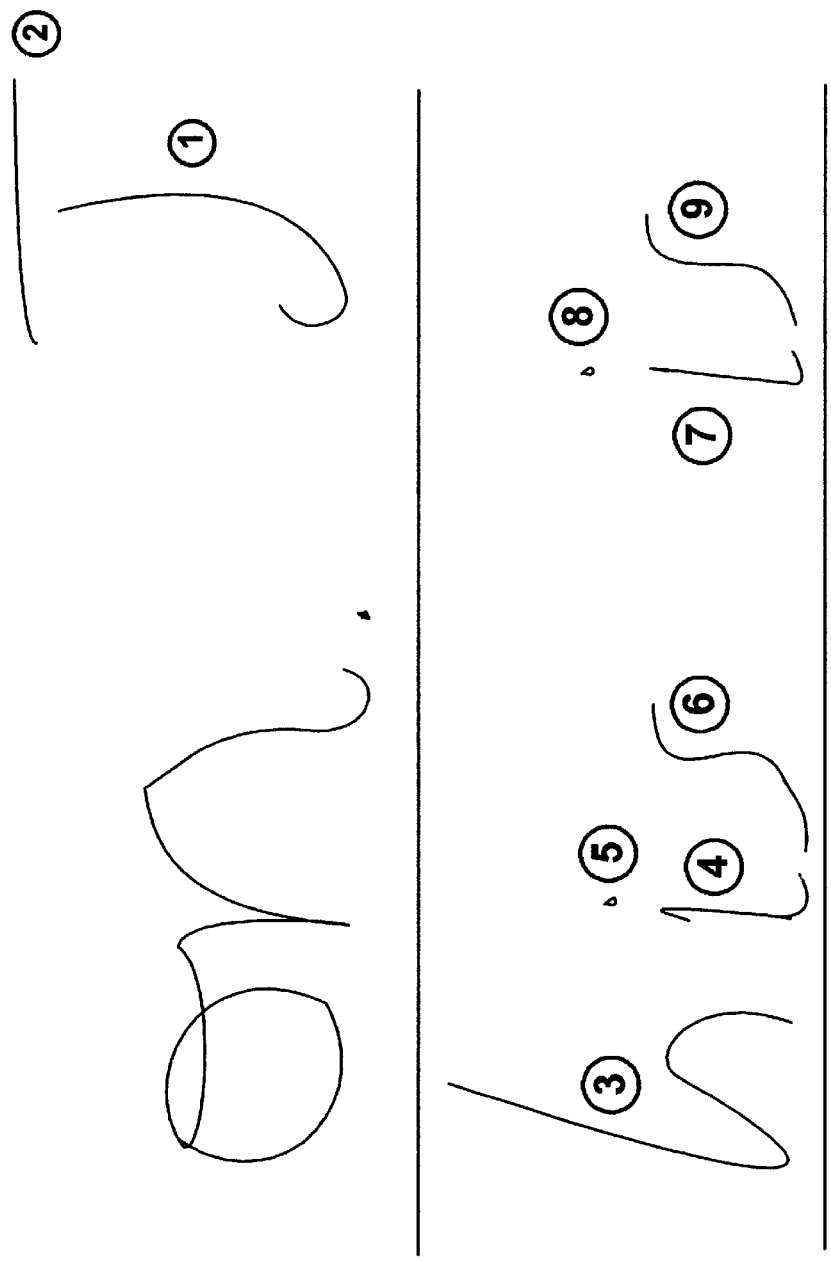
FIG. 6 is a representation of the handwritten data of FIG. 5 after parsing and zooming to emphasize the need for correcting the segmentation in accordance with one aspect of the present invention.

However, in this example, because of the way in which this particular user has written the words, the ink parsing mechanism 58 incorrectly treats the two intended words "This is" as three distinct words, the first word being made up of strokes numbered one (1) and two (2), the second word being made up of strokes numbered three (3) through six (6), and the third word being made up of strokes numbered seven (7) through nine (9). Thus, the ink processor 54 creates three distinct ink word data structures to store the ink data for these three sets of ink. Note that the ink processor 54 has no concept of what the words mean, only that it has determined that there are three distinct words (symbols) for this set of ink. This will, for example, lead to incorrect word wrapping (relative to what the user intended) when re-zoomed, as generally represented in FIG. 6. Also, the user will be able to separately edit each of the three words, even though only two were intended.

Because the recognizer 60 uses far more complex processing, typically including dictionary checking, language models and so forth, the recognizer 60 is more accurate in determining the correct words, and thus the correct word breaks, that is represented by the ink. One suitable recognizer is described in U.S. Pat. Nos. 5,313,527 and 5,467,407, hereby incorporated by reference. However, as will be understood, the present invention will operate with any type of recognizer, including a speech recognizer.

In accordance with one aspect of the present invention, the ink processor 54 feeds the ink data to the recognizer 60 for recognition, such as one line at a time, with the line length being defined at the time the writing was entered by the user, i.e., prior to any zooming in or out. More particularly, the recognizer 60 is fed a series of strokes by the ink processor 54. The strokes on one line are fed at the same time into the recognizer 60, with a stroke identifier, in roughly the order in which it was written. The identifiers of the ink words used for recognition are saved for later. An application programming interface (API) call is used to pass the data, although as can be appreciated, other mechanisms for communicating the data to the handwriting recognizer 60 are feasible. Note that it is feasible to have another set of data passed (e.g., two lines of ink), and the size of the set can vary depending on circumstances such as how much the user was zoomed in while writing, user preferences, and so forth. It is also feasible to pass ink data to the recognizer more frequently, e.g., each time a pen up is detected, and also to pass two lines if the user writes a hyphen at the end of the line. Also, the ink processor 54 may pass its segmenting and other information to the recognizer 60, to assist it in its recognition, although this is generally not necessary.

In response, the recognizer 60 returns a series of ink word-break (scrawl break) structures representing what it thinks the word boundaries are, complete with a list of stroke identifiers. Since recognizers are not perfect, the recognizer may also return a list of probability-ranked alternates for the word, along with the probability information. Thus, a scrawl break is a data structure used to represent a word as determined by the recognizer 60. The following table describes the ScrawlBreak data structure:

```
// The ScrawlBreak structure includes the translation
// results information that is needed to break up a scrawl
// into multiple scrawls, one for each recognized word.
// There is a contract of use/freeing - basically, it
// will be filled in from xlate.c, and is completely
// freed by the caller in txtBuf.c
typedef struct tagSCRAWL_BREAK
{
    U32         strokeCount;
    HLOCAL      hStrokeMem;
    P_U16       pStrokeIDs;     // malloced array of length
                                // strokeCount
    U32         xlateStrLen;
    HLOCAL      hStringMem;
    P_U16       pXlateStr;      // malloced string of length
                                // xlateStringLen
} SCRAWL_BREAK, FAR * P_SCRAWL_BREAK;
```

The following table set forth the API and an interface used for describing the alternates for a word break

```
The api is described in this .idl file fragment
    [
        uuid(10F294B0-D01F-11D2-870B-0000F8756F16),
        helpstring("HwxPhraseTree Class")
    ]
    coclass HwxPhraseTree
    {
        [default] interface IHwxPhraseTree;
```

```
    };
    [
        object,
        uuid(10F294A7-D01F-11D2-870B-0000F8756F16),
        helpstring("IHwxWordGuess Interface"),
        pointer_default(unique)
    ]
    interface IHwxWordGuess : IUnknown
    {
        [id(1), helpstring("Null seperated, double null
    terminated list of alternate translations")]
            HRESULT GetAltList([out] long* pAltListLen, [out]
    BSTR* pbstrAltList);
        [id(2), helpstring("returns an array of stroke IDs
    for this word")]
            HRESULT GetStrokeIDList([in, out] long*
    pnNumStrokes, [out, size_is(*pnNumStrokes)] short
    StrokeList[]);
        [id(3), helpstring("scores for the alternates, in
    the same order as returned by GetAltList")]
            HRESULT GetScores([in, out] long* pnNumScores,
    [out, size_is(*pnNumScores)] long Scores[]);
    };
```

The following table describes a way to walk the results tree for the first choice of phrase breaks:

```
    [
        object,
        uuid(10F294AF-D01F-11D2-870B-0000F8756F16),
        helpstring("IHwxPhraseTree Interface"),
        pointer_default(unique)
    ]
    interface IHwxPhraseTree : IUnknown
    {
        [helpstring("returns an array of addref-ed pointers to
    IWordGuesses for each word break")]
            HRESULT GetWordGuesses([in, out] long* pnWords, [out,
    size_is (*pnWords)] IHwxWordGuess* WordGuesses[]);
    };
```

Figure 7:
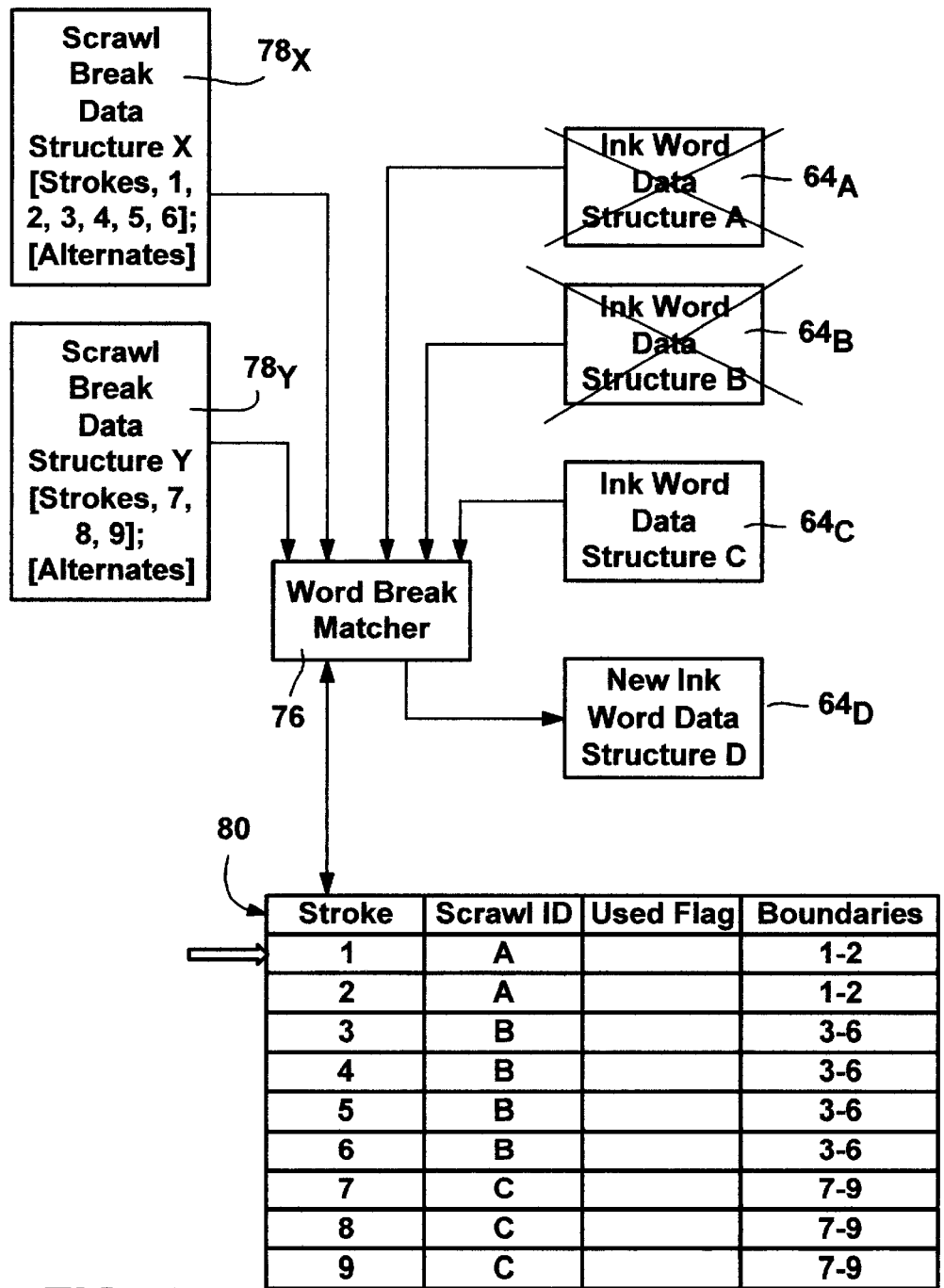
FIGS. 7 and 8 are representations of data structures used by the present invention to analyze and correct for segmentation differences in accordance with one aspect of the present invention.

In accordance with one aspect of the present invention, and as generally represented in FIG. 7, the ink processor 54 includes a work break matching process 76 that compares the scrawl break structures (e.g., $78_X$ and $78_Y$) returned by the recognizer 60 with its own word breaks, (as represented in the ink word data structures), to correct any segmentation errors. In general, if a scrawl-break structure has exactly the same strokes as an ink word data structure, then the existing ink word data structure is used as is, with any information (e.g., the list of alternate guesses returned by the recognizer in the scrawl break structure) ordinarily added to the to the existing ink word data structure. If instead the scrawl break structure is different than an existing ink word data structure, a new ink word data structure is created, with the strokes that compose this word taken from the existing ink word data structure or structures that make up this word. Note that in general, this requires keeping track of the absolute and relative location of each stroke in the document. During the process, once the set of strokes are removed from an existing ink word data structure, the existing ink word data structure is deleted, as are any spaces following it. Whenever a new ink word data structure is added, a new space object is calculated and inserted into the text buffer 62 to represent the space between this word and the following word.

Figure 8:
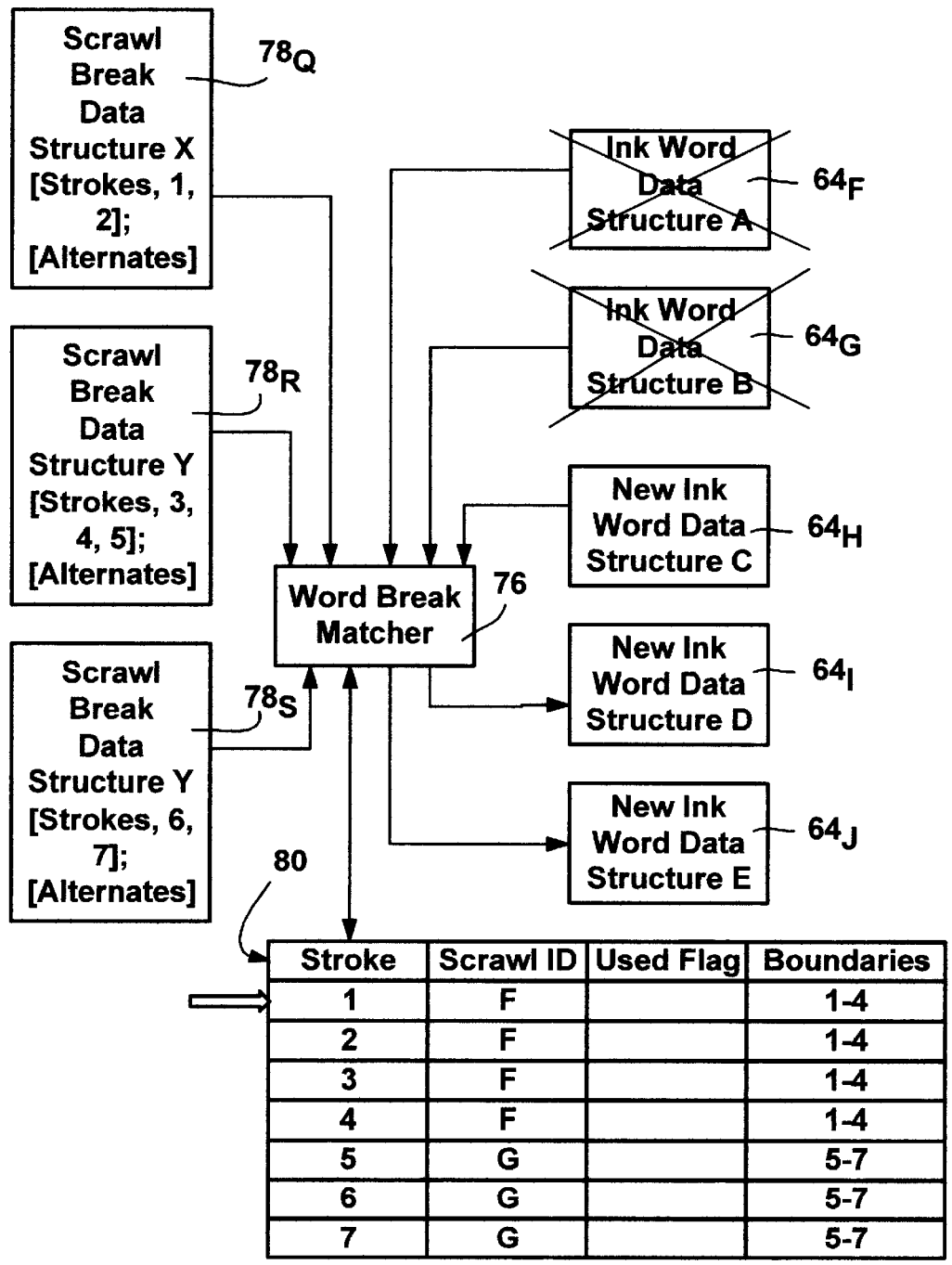
Figure 9:
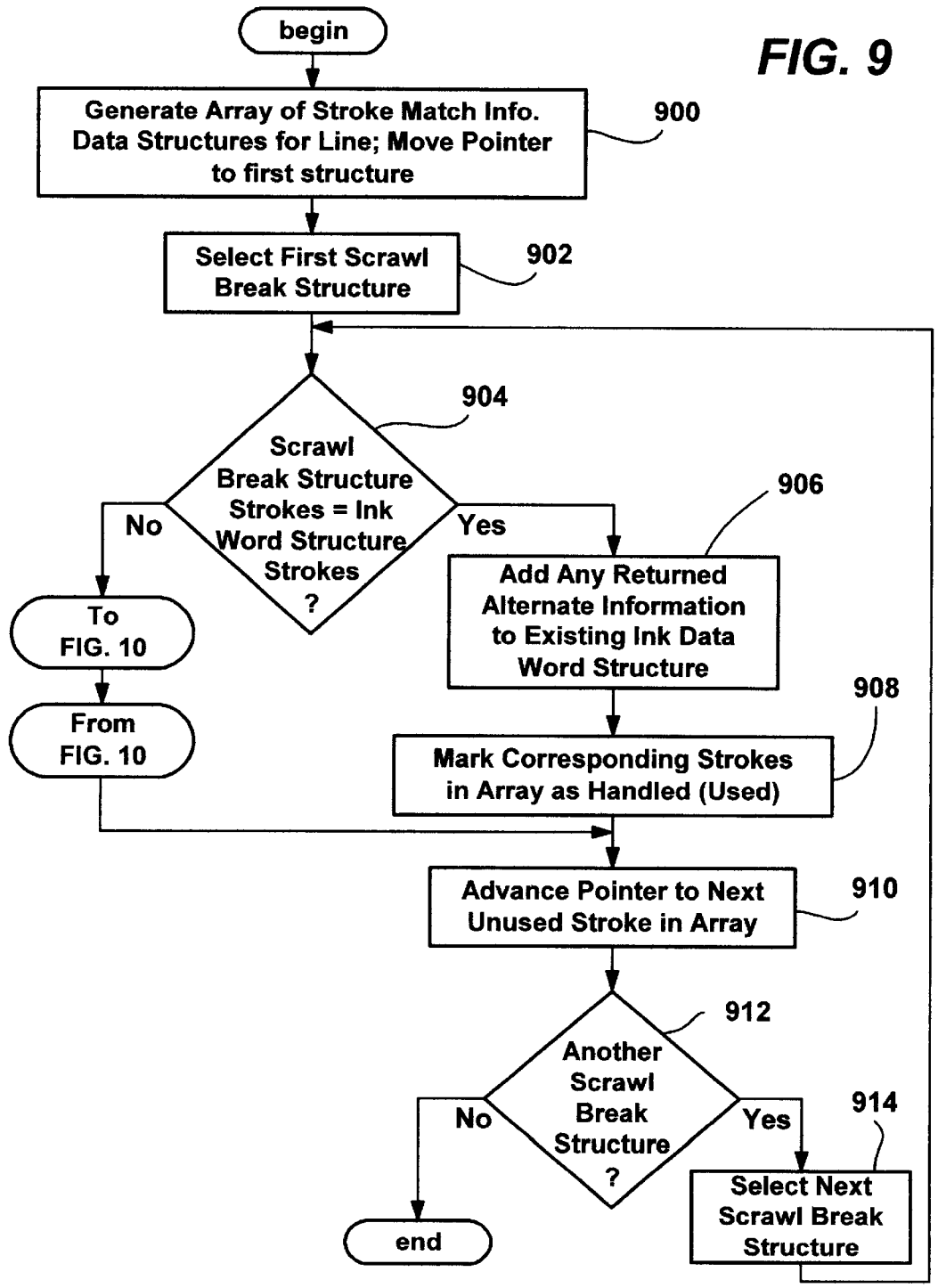
FIGS. 9 and 10 comprise a flow diagram generally describing a process for analyzing and manipulating the data structures to correct for segmentation differences in accordance with one aspect of the present invention.
Figure 10:
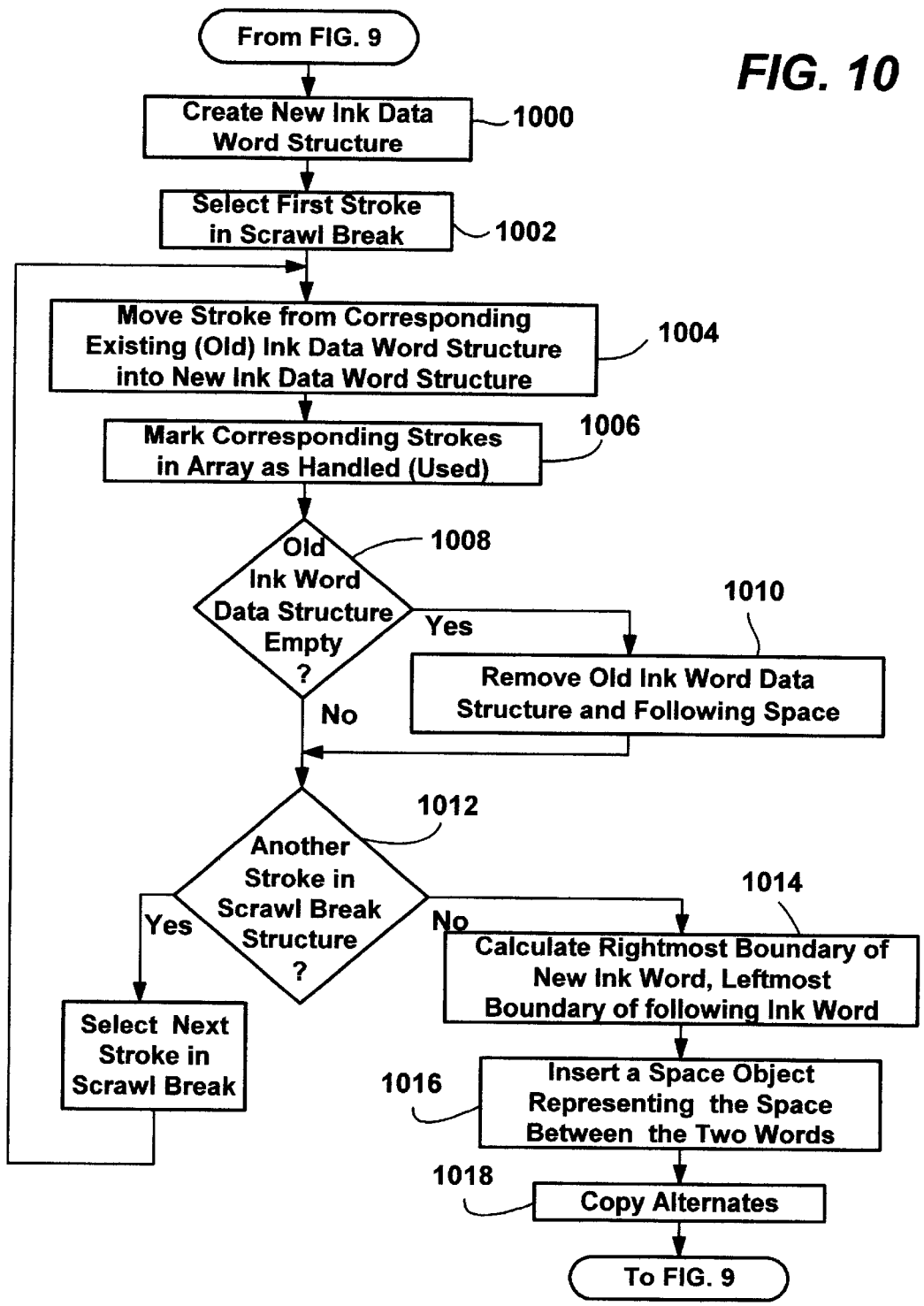

FIGS. 7 and 8, along with the flow diagrams of FIGS. 9 and 10 further illustrate the matching process 76 generally described above. In the example shown in FIG. 7, the line of data of FIG. 5 corresponding the strokes that make up the phrase "This is" has been fed to the recognizer 60, which correctly recognizes the two words, and returns two scrawl break structures $78_X$ and $78_Y$. As represented in FIG. 7, the scrawl break structure $78_X$ returns with information indicating that strokes one (1) through six (6) make up what the recognizer 60 has guessed as being the most likely choice for a first word, along with the text of the translated word and any other alternate candidates, generally ranked by and associated with probability information. Similarly, the scrawl break structure $78_Y$ returns with information indicating that strokes seven (7) through nine (9) make up what the recognizer 60 has guessed as being the most likely choice for a second word, along with its other translation information.

The flow diagrams of FIGS. 9 and 10 describe the matching process, beginning at step 900 of FIG. 9 wherein an array 80 of stroke match information data structures is generated. As will be described, the array 80 is used during the matching process to track the state of handling the strokes that were fed to the recognizer. The array 80 holds, for each stroke sent (e.g., in a single line to the recognizer), the ID of the ink word where it originally came from (A, B or C) in FIG. 7, a flag indicating whether it has been used yet, and the left and right boundaries of the ink word. As also represented at step 900, a pointer to the array 80 is moved to the first stroke, generally represented in FIG. 7 by the arrow pointing to "Stroke 1" of the array 80.

At step 902, the first scrawl break returned by the recognizer (representing the recognizer's first recognized word) is selected. In the present example of FIG. 7, this is the scrawl break $78_X$. Then, step 904 checks to see if the ink word data structure matches the scrawl break strokes. In the present example, this is not currently the situation, (e.g., the strokes in ink word data structure $64_A$ are not the same as the strokes in the scrawl break structure $78_X$), and thus the process branches to step 1000 of FIG. 10.

At step 1000 of FIG. 10, a new ink word data structure ($64_D$ in FIG. 7) is created. Step 1002 represents the selecting of the first stroke in the scrawl break structure $78_X$. For this stroke, the corresponding stroke data is moved from the existing ink word data structure $64_A$ into the new ink word data structure $64_D$. Note that the array 80 tracks in which existing ink word data structure this stroke is found, $64_A$ in the present example. Then, the stroke is marked as handled in the array 80, e.g., its used flag is set.

Step 1008 tests whether all of the strokes have been removed from the existing ink word data structure $64_A$. If so, then this data structure is no longer needed, as its information has been moved into a new structure, and it is removed (e.g., from the text buffer, along with any space character following it) at step 1010. If not, as in the present example wherein only the first stroke has been moved, the process continues to step 1012, which repeats the process until the strokes in the scrawl break have been handled in this manner. Thus, as can be appreciated, strokes one (1) through six (6) are moved into the new ink word data structure $64_D$ in the present example before step 1012 branches to step 1014. Note that after stroke two (2) was handled, the existing ink word data structure $64_A$ was removed via step 1010, as was existing ink word data structure $64_B$ after stroke six (6) was handled, as generally represented by the crossed lines "X-ing out" those structures in FIG. 7.

Once the scrawl break structure's strokes are handled in this manner, steps 1014 and 1016 are executed to calculate the rightmost boundary of the new ink word, and the leftmost boundary of the following ink word, and insert a space object representing the space between the two words.

Note that the last space object on a line is never removed since it is important to the new line. Step 1018 represents the copying of alternate (text) information from the scrawl break into the new ink word data structure. The process then returns to step 910 of FIG. 9.

At step 910, the pointer into the array 80 is advanced to the earliest ink word with any strokes remaining. Note that this handles the situation where strokes might have been removed non-consecutively from several existing ink words. Step 912 then tests whether another scrawl break structure needs to be handled. If not, the process ends, otherwise step 912 branches to step 914 to select this next scrawl break structure (e.g., $78_Y$) before returning to step 904 to handle it.

This time, when step 904 checks to see if the ink word data structure $64_C$ matches the strokes in scrawl break $78_Y$, a match is found. As a result, the existing data structure is valid, although the list of alternates and other information returned by the recognizer can be efficiently copied from the scrawl break structure $78_Y$ into the existing ink word data structure $64_C$ at this time (step 906). Also, the strokes in the existing ink word data structure $64_C$ have been handled, and thus step 908 marks their used flags as such in the array 80. Steps 910, 912 (and possibly 914) operate as described above to continue the process, although in this simplified example, there are no more scrawl breaks to handle and thus the process ends.

The example of FIG. 8 is presents the matching process when the recognizer returns more words (three) than the initial guess of the ink processor (two), which is essentially the opposite of FIG. 7. Thus, three scrawl break structures $78_Q$, $78_R$ and $78_S$ are returned by the recognizer 60, while the ink processor begins with two ink word data structures $64_F$ and $64_G$. Because the steps of FIGS. 9 and 10 have been described above, they will not be again described herein with reference to FIG. 8. However, it should be noted that in general in this example, the first original scrawl $64_F$ is not emptied (steps 1008 and 1010) until sometime after the strokes of the first scrawl break $78_Q$ have been handled and the strokes of the second scrawl break $78_R$ are being evaluated. Also, as a result of the process, three ink word data structures $64_H$, $64_I$ and $64_J$ are created. The pointer to the array 80 keeps everything straight, as each stroke in the original ink word data structure $64_F$ is processed, and each of the original ink word data structures $64_F$ and $64_G$ are maintained until emptied of strokes, at which time they are removed via steps 1008 and 1010.

When the ink processor 54 has completed the matching process, the ink processor can update the display 26 to reflect the modified ink data structures. The ink processor can also replace handwritten data with recognized text if desired.

As can be seen from the foregoing detailed description, there is provided a method and system that corrects for parser segmentation errors by efficiently manipulating stroke data to match data returned from a recognizer. For ink word breaks that are correct, the process is extremely rapid.

While the invention is susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions, and equivalents falling within the spirit and scope of the invention.

What is claimed is:

1. A computer-readable medium having computer-executable instructions, which when executed implement a method, the method comprising:
   collecting a set of ink data;
   parsing the set of ink data into a first segmentation of units of data;
   providing an ink word data structure for each unit of data;
   providing the set of ink data to a recognizer;
   receiving information from the recognizer corresponding to a second segmentation of the set of ink data;
   manipulating the segmented units of data in the first set to correspond to the information received from the recognizer, including moving stroke information from at least one ink word data structure into at least one new ink word data structure.

2. The computer-readable medium of claim 1 wherein providing the set of ink data to a recognizer comprises sending at least one line of ink stroke data thereto.

3. The computer-readable medium of claim 1 wherein manipulating the segmented units of data comprises determining whether the first segmentation corresponds to the second segmentation.

4. The computer-readable medium of claim 1, wherein manipulating the segmented units of data comprises moving stroke information from a plurality of ink word data structures into a new ink word data structure.

5. The computer-readable medium of claim 1, wherein manipulating the segmented units of data comprises moving stroke information from one ink word data structure into at least two new ink word data structures.

6. The computer-readable medium of claim 1, wherein manipulating the segmented units of data comprises moving sets of stroke data corresponding to a plurality of strokes from an ink word data structure into at least one new ink word data structure, and further comprising, maintaining information indicating whether each set of stroke data has been moved.

7. The computer-readable medium of claim 1, further comprising, receiving other data from the recognizer, and adding at least some of the other data to at least one ink word data structure.

8. The computer-readable medium of claim 1, wherein manipulating the segmented units of data comprises moving stroke information from one ink word data structure into two new ink word data structures, and further comprising, maintaining information indicative of a space between the two new ink word data structures.

9. The computer-readable medium of claim 1, wherein manipulating the segmented units of data comprises moving sets of stroke information from an existing ink word data structure into at least one new ink word data structure, and further comprising, checking whether each set of the stroke information from the existing ink word data has been moved, and if so, removing the existing ink word data structure.

10. In a computer device configured to receive handwritten data input from a user, a system comprising,
    an ink processor;
    a parsing mechanism that segments the handwritten data into distinct units of data, each unit having ink data maintained in an ink word data structure;
    a handwriting recognizer connected to the ink processor and configured to receive the handwritten data and to translate the data into computer-readable codes, the handwriting recognizer further returning information corresponding to the recognizer's interpretation of a segmentation of the handwritten data into distinct units of handwritten data; and
    a matching process configured to receive information from the handwriting recognizer and to use the information to correct for differences between the distinct units of data as determined by the parsing mechanism and the distinct units of handwritten data based on the recognizer information, wherein the matching process evaluates the information returned by the recognizer against the ink word data structures, and if the matching process determines that the information returned by the recognizer does not correspond to the ink data in one of the ink word data structures, the matching process creates at least one new ink word data structure.

11. The system of claim 10, further comprising a text buffer configured to maintain information indicative of a relationship of each unit of data.

12. The system of claim 10, wherein the matching process moves data of at least one of the ink word data structures into the new ink word data structure.

13. The system of claim 10, further comprising a text buffer configured to maintain a relationship between each of the ink word data structures, and wherein the matching process inserts the new ink word data structure into the text buffer.

14. The system of claim 10, further comprising a text buffer configured to maintain a relationship between each of the ink word data structures, and wherein the matching process removes at least one ink word data structure from the text buffer.

15. In a computing environment, a method comprising:
    receiving ink data corresponding to a set of strokes;
    parsing the ink data into distinct parsed segments, each parsed segment corresponding to a subset of the set of strokes contained in a distinct ink word data structure;
    providing the ink data to a recognizer;
    displaying a representation of each distinct parsed segment, prior to receiving recognition information about the ink data from the recognizer; and
    determining whether the parsed segments match with segmentation-related recognition information received from the recognizer, and if not, automatically correcting the parsed segments based on the segmentation-related recognition information and redisplaying a corrected representation of the ink data.

16. The method of claim 15, wherein automatically correcting the parsed segments comprises moving stroke information from an ink word data structure into a new ink word data structure.

17. The method of claim 15, wherein automatically correcting the parsed segments comprises moving stroke information from a plurality of ink word data structures into a new ink word data structure.

18. The method of claim 15, wherein automatically correcting the parsed segments comprises moving stroke information from one ink word data structure into at least two new ink word data structures.

19. The method of claim 15, wherein automatically correcting the parsed segments comprises moving sets of stroke data corresponding to a plurality of strokes from an ink word data structure into at least one new ink word data structure, and further comprising, maintaining information indicating whether each set of stroke data has been moved.

20. The method of claim 15, wherein automatically correcting the parsed segments comprises moving stroke information from one ink word data structure into two new ink word data structures, and further comprising, maintaining information indicative of a space between the two new ink word data structures.

21. The method of claim 15, automatically correcting the parsed segments comprises moving sets of stroke information from an existing ink word data structure into at least one new ink word data structure, and further comprising, checking whether each set of the stroke information from the existing ink word data has been moved, and if so, removing the existing ink word data structure.

22. The method of claim 15, wherein providing the ink data to a recognizer comprises sending at least one line of ink stroke data that includes the ink data to the recognizer.

23. A computer-readable medium having computer-executable instructions which when executed perform the method of claim 15.

* * * * *